(12) United States Patent
Oka et al.

(10) Patent No.: US 11,292,893 B2
(45) Date of Patent: Apr. 5, 2022

(54) RESIN COMPOSITION, MOLDED ARTICLE, LAMINATE, GAS BARRIER MATERIAL, COATING MATERIAL AND ADHESIVE

(71) Applicants: DIC Corporation, Tokyo (JP); National Institute of Advanced Industrial Science and Technology, Tokyo (JP)

(72) Inventors: Yasutaka Oka, Sakura (JP); Tomoaki Harada, Sakura (JP); Kumiko Akiba, Sakura (JP); Yusho Usami, Sakura (JP); Michiya Nakashima, Sakura (JP); Takeo Ebina, Sendai (JP); Ryo Ishii, Sendai (JP); Takafumi Aizawa, Sendai (JP)

(73) Assignees: DIC Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 229 days.

(21) Appl. No.: 16/489,717

(22) PCT Filed: Mar. 14, 2018

(86) PCT No.: PCT/JP2018/010021
§ 371 (c)(1),
(2) Date: Aug. 29, 2019

(87) PCT Pub. No.: WO2018/168945
PCT Pub. Date: Sep. 20, 2018

(65) Prior Publication Data
US 2019/0382558 A1 Dec. 19, 2019

(30) Foreign Application Priority Data

Mar. 14, 2017 (JP) .............................. JP2017-049129
Jun. 30, 2017 (JP) .............................. JP2017-129269
Sep. 4, 2017 (JP) .............................. JP2017-169513

(51) Int. Cl.
*C08K 9/02* (2006.01)
*C09D 7/62* (2018.01)
(Continued)

(52) U.S. Cl.
CPC .................. *C08K 9/02* (2013.01); *B32B 1/00* (2013.01); *B32B 15/043* (2013.01); *B32B 15/08* (2013.01); *B32B 15/095* (2013.01); *B32B 15/10* (2013.01); *B32B 15/12* (2013.01); *B32B 21/042* (2013.01); *B32B 21/06* (2013.01); *B32B 21/08* (2013.01); *B32B 27/08* (2013.01); *B32B 27/10* (2013.01); *B32B 27/18* (2013.01); *B32B 27/20* (2013.01); *B32B 27/22* (2013.01); *B32B 27/24* (2013.01); *B32B 27/40* (2013.01); *B32B 29/005* (2013.01); *C08G 18/10* (2013.01); *C08G 18/3212* (2013.01); *C08G 18/348* (2013.01); *C08G 18/44* (2013.01); *C08G 18/4854* (2013.01); *C08G 18/765* (2013.01); *C08G 18/7642* (2013.01); *C08G 18/8048* (2013.01); *C08K 3/34* (2013.01); *C08L 75/04* (2013.01); *C09D 5/00* (2013.01); *C09D 7/61* (2018.01); *C09D 7/62* (2018.01); *C09D 175/04* (2013.01); *C09J 11/04* (2013.01); *C09J 175/04* (2013.01); *B32B 2264/10* (2013.01); *B32B 2264/101* (2013.01); *B32B 2264/102* (2013.01); *B32B 2264/105* (2013.01); *B32B 2307/7244* (2013.01); *B32B 2307/7246* (2013.01); *B32B 2419/00* (2013.01);
(Continued)

(58) Field of Classification Search
CPC ......... B32B 27/18; B32B 27/40; B32B 27/24; B32B 27/10; B32B 21/08; B32B 15/08; B32B 27/20; B32B 21/06; B32B 27/08; B32B 15/043; B32B 15/10; B32B 1/00; B32B 15/095; B32B 21/042; B32B 29/005; B32B 27/22; B32B 15/12; B32B 2264/101; B32B 2307/7246; B32B 2264/102; B32B 2457/00; B32B 2419/00; B32B 2553/00; B32B 2264/105; B32B 2307/7244; B32B 2264/10; C08G 18/10; C08G 18/3212; C08G 18/348; C08G 18/44; C08G 18/7642; C08G 18/765; C08G 18/8048; C08G 18/4854; C08K 9/02; C08K 3/34; C08K 3/346; C08L 75/04; C09D 7/62; C09D 175/04; C09J 11/04; C09J 175/04
See application file for complete search history.

(56) References Cited

U.S. PATENT DOCUMENTS 6,774,177 B1    8/2004   Wilke
11,015,013 B2 * 5/2021   Usami .................. C09D 175/06
(Continued)

FOREIGN PATENT DOCUMENTS

CN    1655059 A    8/2005
CN    1918223 A    2/2007
(Continued)

OTHER PUBLICATIONS

Machine English translation of CN102251400 Wang et al., dated Nov. 23, 2011.*

(Continued)

*Primary Examiner* — Patrick D Niland
(74) *Attorney, Agent, or Firm* — Locke Lord LLP; James E. Armstrong, IV; Nicholas J. DiCeglie, Jr.

(57) ABSTRACT

A resin composition is provided that contains a urethane resin and a smectite with partially immobilized lithium.

16 Claims, No Drawings

(51) Int. Cl.

| | | |
|---|---|---|
| *B32B 27/18* | (2006.01) |
| *B32B 27/40* | (2006.01) |
| *C08G 18/10* | (2006.01) |
| *C08G 18/32* | (2006.01) |
| *C08G 18/34* | (2006.01) |
| *C08G 18/44* | (2006.01) |
| *C08G 18/76* | (2006.01) |
| *C08K 3/34* | (2006.01) |
| *C09D 175/04* | (2006.01) |
| *C09J 11/04* | (2006.01) |
| *C09J 175/04* | (2006.01) |
| *B32B 27/24* | (2006.01) |
| *B32B 27/10* | (2006.01) |
| *B32B 21/08* | (2006.01) |
| *B32B 15/08* | (2006.01) |
| *C08G 18/48* | (2006.01) |
| *B32B 27/20* | (2006.01) |
| *B32B 21/06* | (2006.01) |
| *B32B 27/08* | (2006.01) |
| *B32B 15/04* | (2006.01) |
| *B32B 15/10* | (2006.01) |
| *B32B 1/00* | (2006.01) |
| *B32B 15/095* | (2006.01) |
| *B32B 21/04* | (2006.01) |
| *B32B 29/00* | (2006.01) |
| *C08L 75/04* | (2006.01) |
| *B32B 27/22* | (2006.01) |
| *B32B 15/12* | (2006.01) |
| *C08G 18/80* | (2006.01) |
| *C09D 7/61* | (2018.01) |
| *C09D 5/00* | (2006.01) |

(52) U.S. Cl.
 CPC ....... *B32B 2457/00* (2013.01); *B32B 2553/00* (2013.01); *C08K 3/346* (2013.01)

(56) References Cited

U.S. PATENT DOCUMENTS

| | | |
|---|---|---|
| 2016/0053110 A1 | 2/2016 | Takeda et al. |
| 2016/0159965 A1 | 6/2016 | Uchida et al. |

FOREIGN PATENT DOCUMENTS

| | | |
|---|---|---|
| CN | 101225226 A | 7/2008 |
| CN | 102251400 A | 11/2011 |
| CN | 102448884 A | 5/2012 |
| CN | 102939199 A | 2/2013 |
| CN | 104870561 A | 8/2015 |
| CN | 105408378 A | 3/2016 |
| JP | H10-249978 A | 9/1998 |
| JP | 2006-193657 A | 7/2006 |
| JP | 2007-277078 A | 10/2007 |
| JP | 2008-247695 A | 10/2008 |
| JP | 2009-107907 A | 5/2009 |
| JP | 2011-051845 A | 3/2011 |
| JP | 2012-121777 A | 6/2012 |
| JP | 2015-044396 A | 3/2015 |
| JP | 2017-031015 A | 2/2017 |
| JP | 2017-105991 A | 6/2017 |
| WO | 2010/147147 A1 | 12/2010 |
| WO | 2011/152500 A1 | 12/2011 |
| WO | 2013/027609 A1 | 2/2013 |
| WO | 2014/103994 A1 | 7/2014 |
| WO | 2016-158794 A | 10/2016 |

OTHER PUBLICATIONS

Machine English translation of JP 2006-193657, Takuzo, Jul. 27, 2006.*
Machine English translation of JP 2007-277078, Takeo et al., dated Oct. 25, 2007.*
International Search Report dated Jun. 19, 2018, issued for PCT/JP2018/010021.
Office Action dated Mar. 2, 2021, issued for CN Patent Application No. 201880017516.3.
International Preliminary Report on Patentability (IPRP) dated Sep. 26, 2019, issued for PCT/JP2018/010021.
International Search Report dated Apr. 3, 2018, issued for PCT/JP2017/045544.
International Preliminary Report on Patentability dated Jul. 2, 2019 and Written Opinion dated Apr. 3, 2018, issued for PCT/JP2017/045544.
Office Action issued in Chinese Patent Application No. CN 201780080425.X, dated Mar. 2, 2021.

* cited by examiner

RESIN COMPOSITION, MOLDED ARTICLE, LAMINATE, GAS BARRIER MATERIAL, COATING MATERIAL AND ADHESIVE

TECHNICAL FIELD

The present invention relates to a resin composition, a molded article, a laminate, a gas barrier material, a coating material, and an adhesive.

BACKGROUND ART

Packaging materials used to package food or similar things are required to have functions such as the protection of their contents, retort resistance, heat resistance, transparency, and workability. To keep the contents in good condition, gas barrier properties are particularly important. Recently, not only packaging materials but also materials for electronic materials, including solar cells and semiconductors, have become required to have high gas barrier properties.

In PTL 1, it is described that combining a resin having a hydroxyl group and an isocyanate compound with a sheet inorganic compound, such as a clay mineral, and a light-screening agent improves gas barrier and other characteristics.

PTL 2, moreover, describes a material that is primarily modified clay. According to PTL 2, the use of modified clay, optionally with additives, and arraying crystals of the modified clay into dense layers gives a film material that has a mechanical strength high enough that the material can be used as a self-supporting membrane, gas barrier properties, waterproofness, heat stability, and flexibility.

CITATION LIST

Patent Literature

PTL 1: International Publication No. 2013/027609
PTL 2: Japanese Unexamined Patent Application Publication No. 2007-277078

SUMMARY OF INVENTION

Technical Problem

Sheet inorganic compounds of the type described in PTL 1 are bulky, and with such a compound, it is difficult to achieve good compatibility with resins. This means there is a limit to how much such a compound can be added and to its dispersibility. It is therefore difficult to achieve even higher gas barrier properties by adding more of such a compound, and even if it were possible to increase the amount of filler added, dispersibility could not be sufficient, and the gas barrier properties could not be sufficient.

As for the clay membrane described in PTL 2, the substrate on which the clay membrane is formed (e.g., a resin substrate) is required to have very high heat resistance because the membrane is made into a self-supporting membrane by heating after its formation. Usable only with a substrate having very high heat resistance (e.g., a resin substrate), therefore, the viscosity membrane described in PTL 2 has the disadvantage of limited use. Furthermore, the self-supporting membrane described in PTL 2 contains much filler so that it will exhibit high gas barrier properties. Too much filler, however, causes the disadvantage, for example if the membrane is used in film applications for soft packaging, of a lack of flexibility of the film because the filler affects the softness of the composition. For this reason, there remains a need for a resin composition that exhibits high barrier properties regardless of whether it has a high or low filler content.

An object of the present invention is therefore to provide a resin composition that gives a resin film superior in gas barrier properties, in particular water vapor and oxygen barrier properties.

Solution to Problem

The inventors found that a smectite with partially immobilized lithium, obtained through prior heat treatment, exhibits improved dispersibility in resins, helps prevent the deterioration of the resin used therewith, and can be adapted to a wide range of resins and, as a consequence of these and other reasons, is suitable for use as a filler in a resin composition superior in gas barrier properties. Combining this smectite with partially immobilized lithium with a urethane resin, moreover, results in excellent gas barrier properties. Based on these findings, the inventors completed the present invention.

That is, a resin composition according to an aspect of the present invention contains a urethane resin and a smectite with partially immobilized lithium. By virtue of the combination of a urethane resin with a smectite with partially immobilized lithium, this resin composition gives a resin film superior in gas barrier properties, such as water vapor and oxygen barrier properties (e.g., oxygen barrier properties under high-humidity conditions).

The urethane resin may be a product of reaction between a polyol and a polyisocyanate.

The urethane resin may have carboxyl groups. If the urethane resin has carboxyl groups, it is preferred that the resin composition further contain a compound having an epoxy group (compound C). The epoxy group of the compound C and the carboxyl groups react together to form a crosslink structure, which allows the resin composition to exhibit high oxygen barrier properties under high-humidity conditions.

In a first mode, the urethane resin having carboxyl groups is preferably a product of reaction between a compound A, represented by formula (1) below, and a compound B, represented by formula (2) below. By virtue of the combination of a carboxyl-containing urethane resin as a product of reaction between compounds A and B with a smectite with partially immobilized lithium, the resin composition according to the first mode gives a resin film better in gas barrier properties (water vapor barrier properties, oxygen barrier properties, etc.).

[Chem. 1]

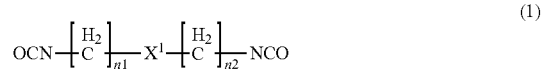

(1)

[In formula (1), X¹ represents an aromatic or aliphatic ring structure, and n1 and n2 each independently represent an integer of 0 to 3.]

[Chem. 2]

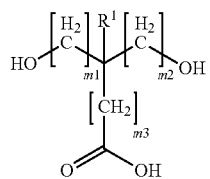

(2)

[In formula (2), $R^1$ represents a hydrogen atom, C1-3 hydrocarbon group, or carbonyl group, and m1 to m3 each independently represent an integer of 0 to 3.]

In a second mode, the urethane resin is preferably a product of reaction between a compound C as a compound having an epoxy group and a carboxyl-containing urethane resin as a product of reaction between a compound A, represented by formula (1) above, and a compound B, represented by formula (2) above. By virtue of the combination of a urethane resin as a product of reaction between compounds A, B, and C (product of reaction between a compound C and a carboxyl-containing urethane resin as a product of reaction between compounds A and B) with a smectite with partially immobilized lithium, the resin composition according to the second mode gives a resin film better in gas barrier properties (water vapor barrier properties, oxygen barrier properties, etc.).

In a third mode, the urethane resin preferably has an alicyclic backbone. By virtue of the combination of a urethane resin having an alicyclic backbone with a smectite with partially immobilized lithium, the resin composition according to the third mode gives a resin film better in gas barrier properties (water vapor barrier properties, oxygen barrier properties, etc.).

In the urethane resin having an alicyclic backbone, the alicyclic backbone preferably includes a bridged ring.

A resin composition according to another aspect of the present invention contains a compound A, represented by formula (1) above, a compound B, represented by formula (2) above, and a smectite with partially immobilized lithium. Allowing the compounds A and B to react together will turn this resin composition into a resin composition according to the first mode. By virtue of the combination of a compound A, a compound B, and a smectite with partially immobilized lithium, this resin composition gives a resin film better in gas barrier properties (water vapor barrier properties, oxygen barrier properties, etc.). This resin composition may further contain a compound C, a compound having an epoxy group.

The structure represented by X' in formula (1) above is preferably a benzene or naphthalene ring structure. This results in higher oxygen barrier properties under high-humidity conditions.

The compound C preferably has an aromatic or aliphatic ring structure and two or more epoxy groups and more preferably is a compound represented by formula (3) below. This results in higher barrier properties.

[Chem. 3]

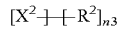

(3)

[In formula (3), $X^2$ represents an aromatic or aliphatic ring structure, n3 represents an integer of 2 to 6, and $R^2$s each independently represent a group represented by formula (4) below.

[Chem. 4]

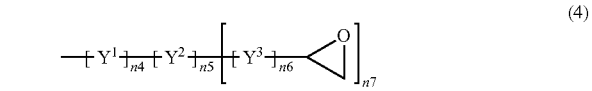

(4)

(In formula (4), $Y^1$ and $Y^3$ each independently represent a divalent hydrocarbon group or oxygen atom, $Y^2$ represents a trivalent hydrocarbon group or nitrogen atom, n4 and n6 each independently represent an integer of 0 to 3, n5 represents 0 or 1, n7 represents 1 or 2, if n5 is 0, n7 is 1, and if n5 is 1, n7 is 2.)]

The smectite with partially immobilized lithium preferably has a cation exchange capacity of 1 to 70 meq/100 g. This makes the resin composition even better in water vapor and oxygen barrier properties.

The smectite with partially immobilized lithium is preferably present in an amount of 3% to 70% by mass based on the total nonvolatile content of the resin composition. Such an amount results in a resin composition even better in formability as well as superior in water vapor and oxygen barrier properties.

The present invention, in an aspect, provides an article molded from a resin composition as described above and a laminate having this molded article on a substrate (laminate including a substrate and a molded article on the substrate).

The resin compositions described above give resin films superior in water vapor and oxygen barrier properties. These resin compositions are therefore suitable for use in applications such as gas barrier materials, coating materials, and adhesives.

Advantageous Effects of Invention

The present invention makes it possible to provide a resin composition that gives a resin film superior in gas barrier properties, in particular water vapor and oxygen barrier properties.

DESCRIPTION OF EMBODIMENTS

The following describes preferred embodiments of the present invention in detail. The present invention, however, is not limited to these embodiments.

<Resin Composition>

A resin composition according to an embodiment contains a urethane resin and a smectite with partially immobilized lithium.

(Smectite with Partially Immobilized Lithium)

Smectite is a kind of sheet-structured phyllosilicate mineral (sheet clay mineral). Known specific structures of smectite include montmorillonite, beidellite, saponite, hectorite, stevensite, and sauconite. Of these, as the structure(s) of a clay material, at least one structure selected from the group consisting of montmorillonite and stevensite is preferred. In these structures, a metal element in octahedral sheets has been partially replaced, for example with a lower-valency metal element resulting from isomorphous substitution or with a defect. The octahedral sheets are therefore negatively charged. As a consequence, these structures have vacant sites in their octahedral sheets, and in smectites having these structures, as discussed hereinafter, lithium ions can exist stably after movement.

A smectite in which the retained cation is the lithium ion is referred to as a lithium smectite (Smectites with partially immobilized lithium as described hereinafter are excluded.). An example of a method for exchanging a cation in a smectite with the lithium ion is a cation exchange by adding a lithium salt, such as lithium hydroxide or lithium chloride, to a liquid dispersion (dispersion slurry) of a natural sodium smectite. By controlling the amount of lithium added to the liquid dispersion, the quantity of lithium ions in the cation leaching from the resulting lithium smectite can be controlled to an appropriate level. A lithium smectite can alternatively be obtained by a column or batch process that uses a cation-exchange resin that retains lithium ions as a result of ion exchange.

In an embodiment, smectite with partially immobilized lithium refers to a lithium smectite in which a subset of the lithium ions are immobilized in vacant sites in the octahedral sheets. A smectite with partially immobilized lithium is obtained as a result of the immobilization of interlayer lithium ions into vacant sites in the octahedral sheets, for example through the heating of a lithium smectite. The immobilization of lithium ions makes the smectite waterproof.

The temperature conditions for the heating for the partial immobilization of lithium are not critical as long as lithium ions can be immobilized. As discussed hereinafter, a small cation exchange capacity (CEC) will lead to a greater improvement in the water vapor and oxygen barrier properties of the resin composition containing the smectite with partially immobilized lithium. It is therefore preferred to heat the lithium smectite at 150° C. or above so that the heating will immobilize lithium ions efficiently and thereby reduce the cation exchange capacity greatly. The temperature for the heating is more preferably between 150° C. and 600° C., even more preferably between 180° C. and 600° C., in particular between 200° C. and 500° C., the most preferably between 250° C. and 500° C. Heating at such temperatures ensures higher efficiency in reducing the cation exchange capacity and, at the same time, helps prevent events such as the dehydration of hydroxyl groups in the smectite. The heating is performed preferably in an open electric furnace. This ensures that the relative humidity is 5% or less and the pressure is atmospheric pressure during heating. The duration of the heating is not critical as long as lithium can be partially immobilized, but preferably is between 0.5 and 48 hours, more preferably between 1 and 24 hours, in light of production efficiency.

Whether the resultant substance is a smectite with partially immobilized lithium or not can be determined by x-ray photoelectron spectroscopy (XPS). Specifically, in the XPS spectrum measured by XPS, the position of the binding energy peak attributable to the Li ion is checked. For example, if the smectite is montmorillonite, changing the lithium smectite into a smectite with partially immobilized lithium, for example by heating, will shift the position of the binding energy peak attributable to the Li ion in the XPS spectrum from 57.0 ev to 55.4 ev. If the smectite is montmorillonite, therefore, whether the spectrum has a 55.4-ev binding energy peak is the criterion for whether the smectite is a partially immobilized type or not.

The cation exchange capacity of the smectite with partially immobilized lithium is preferably 70 meq/100 g or less, more preferably 60 meq/100 g or less so that the resin composition will be even better in water vapor and oxygen barrier properties (e.g., oxygen barrier properties under high-humidity conditions). The cation exchange capacity of the smectite with partially immobilized lithium is 1 meq/100 g or more, more preferably 5 meq/100 g or more, even more preferably 10 meq/100 g or more so that the resin composition will be even better in water vapor and oxygen barrier properties (e.g., oxygen barrier properties under high-humidity conditions). In light of these, the cation exchange capacity of the smectite with partially immobilized lithium is between 1 and 70 meq/100 g, more preferably between 5 and 70 meq/100 g, even more preferably between 10 and 60 meq/100 g. If the smectite is montmorillonite, for example, the cation exchange capacity is usually between about 80 and 150 meq/100 g, but partial immobilization will reduce it to between 5 and 70 meq/100 g. The cation exchange capacity of the smectite with partially immobilized lithium may be less than 60 meq/100 g or may even be 50 meq/100 g or less. For example, the cation exchange capacity of the smectite with partially immobilized lithium may be 1 meq/100 g or more and less than 60 meq/100 g, may be 5 meq/100 g or more and less than 60 meq/100 g, or may be 10 meq/100 g or more and less than 60 meq/100 g.

The cation exchange capacity of a smectite can be measured by a method based on Schollenberger's process (the Third Edition of the Handbook of Clays and Clay Minerals, edited by the Clay Science Society of Japan, May 2009, pp. 453-454). More specifically, it can be measured by the method set forth in Japan Bentonite Association Standard test method JBAS-106-77.

The cation leaching from a smectite can be calculated by leaching interlayer cations in the smectite using 100 mL of 1 M aqueous solution of ammonium acetate per 0.5 g of smectite over at least 4 hours and measuring the concentrations of cations in the resulting solution, for example by ICP emission spectrometry or atomic absorption spectrometry.

The amount of the smectite with partially immobilized lithium is preferably 3% by mass or more of the total nonvolatile content of the resin composition. If the amount of the smectite with partially immobilized lithium is 3% by mass or more of the total nonvolatile content, the resin composition is even better in water vapor and oxygen barrier properties (e.g., oxygen barrier properties under high-humidity conditions). In the same light, the amount of the smectite with partially immobilized lithium may be 5% by mass or more, 7% by mass or more, 9% by mass or more, 10% by mass or more, 15% by mass or more, 18% by mass or more, 20% by mass or more, 25% by mass or more, or 30% by mass or more of the total nonvolatile content of the resin composition. The amount of the smectite with partially immobilized lithium is preferably 70% by mass or less of the total nonvolatile content of the resin composition. If the amount of the smectite with partially immobilized lithium is 70% by mass or less, the resin composition is even better in formability and is improved in adhesion to a substrate. The oxygen barrier properties under high-humidity conditions also become higher. In the same light, the amount of the smectite with partially immobilized lithium may be 50% by mass or less, 45% by mass or less, 40% by mass or less, 35% by mass or less, or 30% by mass or less of the total nonvolatile content of the resin composition. These upper and lower limits can be paired in any combination. That is, the amount of the smectite with partially immobilized lithium may be, for example, between 3% and 70% by mass, between 3% and 50% by mass, between 3% and 35% by mass, between 5% and 35% by mass, between 5% and 30% by mass, between 7% and 30% by mass, between 7% and 30% by mass, between 9% and 30% by mass, or between 10% and 30% by mass of the total nonvolatile content of the resin composition. In similar statements herein, too, the specified upper and lower limits can be paired in any combination. The nonvolatile content is defined as the mass that is left after subtracting the mass of diluents and the mass of volatile components in the urethane resin, in modifiers, and in additives from the total mass of the resin composition.

(Urethane Resin)

A urethane resin is a compound having urethane linkages. The polystyrene-equivalent weight-average molecular weight as measured by GPC (gel permeation chromatography) is not critical, but preferably is between 500 and 1000000. The urethane linkages can be obtained by, for example, reacting a polyisocyanate compound with a polyol, which contains two or more hydroxyl groups per molecule. That is, the urethane resin is preferably a product of reaction between a polyol and a polyisocyanate.

The resin composition may be one obtained by synthesizing a urethane resin and mixing the synthesized urethane resin with a smectite with partially immobilized lithium or may be one obtained by blending a polyisocyanate, a polyol, and a smectite with partially immobilized lithium and then allowing the polyisocyanate and polyol to react together. Alternatively, a mixture prepared beforehand of one urethane raw material (one of a polyisocyanate and a polyol) with a smectite with partially immobilized lithium may be mixed with the other urethane raw material. In any case, a urethane catalyst, such as a tin compound, may be used.

The polyol can be any compound that has two or more hydroxyl groups. The polyol can be, for example, an aliphatic polyol, a polyester polyol, a polyether polyol, a polycarbonate polyol, a polyolefin polyol, a polyacrylic polyol, or a dimer diol. One of these polyols may be used alone, or two or more may be used in combination. The hydroxyl value of the polyol(s) is not critical, but preferably is between 20 and 300 (mg KOH/g) (The hydroxyl value is, for example, as determined in accordance with JIS K1557-1.).

An aliphatic polyol can be, for example, a C2-6 alkylene diol. Examples of C2-6 alkylene diols include diols such as ethylene glycol, propylene glycol, butylene glycol, 1,5-pentanediol, 1,6-hexanediol, dimethylbutanediol, butylethylpropanediol, diethylene glycol, triethylene glycol, tetraethylene glycol, and dipropylene glycol.

A polyether polyol can be, for example, polytetramethylene ether glycol, polypropylene glycol, polyethylene glycol, a polyethylene glycol/polypropylene glycol block copolymer, a propylene glycol propylene oxide adduct, a bisphenol A propylene oxide adduct, a glycerol propylene oxide adduct, an ethylenediamine propylene oxide adduct, an ethylenediamine propylene oxide adduct, a sorbitol-based propylene oxide adduct, a sucrose-based propylene oxide adduct, or a propylene oxide-ethylene oxide random polyether.

A polycarbonate polyol can be, for example, one represented by the general formula HO—R—[(OCOO)—R]$_n$—OH (where R is a divalent organic group, and n is a number of 1 or more), and examples of Rs include alkylene, arylene, cycloalkylene, and aralkylene groups and combinations thereof. n is preferably a number that makes a preferred hydroxyl value as mentioned above. Specific examples include DURANOL G3452, G4672, T5651, and T5652 (trade names) (DURANOL is a registered trademark; the same applies hereinafter), available from Asahi Kasei Corporation, BENEBiOL NLB (trade name) (BENEBiOL is a registered trademark), available from Mitsubishi Chemical Corporation, and NIPPOLAN 981, NIPPOLAN 980R, NIPPOLAN 982R, NIPPOLAN 963, and NIPPOLAN 964 (trade names) (NIPPOLAN is a registered trademark), available from Tosoh Corporation.

A polyester polyol can be, for example, a product of reaction between a carboxylic acid (or its salt) or dicarboxylic anhydride and a polyhydric alcohol or a polymer resulting from ring-opening polymerization of caprolactone. In the former case, carboxylic acids that can be used include aliphatic dicarboxylic acids, such as adipic acid, alicyclic dicarboxylic acids, such as 1,3-cyclopentanedicarboxylic acid, aromatic dicarboxylic acids, such as phthalic acid, anhydrides of these dicarboxylic acids, ester-forming derivatives, for example of p-hydroxybenzoic acid and p-(2-hydroxyethoxy)benzoic acid, and polybasic acids of ester-forming derivatives of these dihydroxycarboxylic acids, and these carboxylic acids can be used alone or as a mixture of two or more. The polyhydric alcohol can be, for example, a C1-12 alkylenediol, such as ethylene glycol, propylene glycol, 1,4-butanediol, 1,5-pentanediol, 1,6-hexanediol, dimethylbutanediol, butylethylpropanediol, diethylene glycol, triethylene glycol, tetraethylene glycol, or dipropylene glycol. Examples in the latter case include polymers resulting from ring-opening polymerization of ε-caprolactam, γ-valerolactam, β-propiolactam, etc.

The polyisocyanate can be any compound that has two or more isocyanate groups. The polyisocyanate can be, for example, an aromatic polyisocyanate, an aliphatic or alicyclic polyisocyanate, or a modified form thereof. Examples of aromatic polyisocyanates include polymethylene polyphenyl polyisocyanate, diphenylmethane diisocyanate, carbodiimide-modified diphenylmethane diisocyanate, phenylene diisocyanate, and tolylene diisocyanate. Examples of aliphatic or alicyclic polyisocyanates include hexamethylene diisocyanate, lysine diisocyanate, 1,3-bis(isocyanatomethyl)cyclohexane, cyclohexane diisocyanate, methylcyclohexane diisocyanate, isophorone diisocyanate, trimethylhexamethylene diisocyanate, dicyclohexylmethane diisocyanate, norbornene diisocyanate, dimer acid diisocyanates, xylylene diisocyanate, tetramethylxylylene diisocyanate, toluene diisocyanate, and trimers of these isocyanates. Examples of modified polyisocyanates include trimethylolpropane adduct-type, isocyanurate-type, biuret-type, and allophanate-type polyisocyanates. One of these polyisocyanates may be used alone, or two or more may be used in combination.

The polyisocyanate may be a blocked isocyanate. The isocyanate blocking agent can be, for example, a phenolic compound, such as phenol, thiophenol, methyl thiophenol, ethyl thiophenol, cresol, xylenol, resorcinol, nitrophenol, or chlorophenol, an oxime, such as acetoxime, methyl ethyl ketoxime, or cyclohexanone oxime, an alcohol, such as methanol, ethanol, propanol, or butanol, a halogenated alcohol, such as ethylene chlorohydrin or 1,3-dichloro-2-propanol, a tertiary alcohol, such as t-butanol or t-pentanol, or a lactam, such as ε-caprolactam, δ-valerolactam, γ-butyrolactam, or β-propiolactam or can even be an aromatic amine, an imide, acetylacetone, an active methylene compound such as an acetoacetic ester or ethyl malonate, a mercaptan, an imine, a urea compound, a diaryl compound, or sodium bisulfite. A blocked isocyanate can be obtained by subjecting an isocyanate compound as described above and an isocyanate blocking agent to addition reactions by an appropriate known method.

The urethane resin can be obtained by, for example, allowing a polyol as described above and a polyisocyanate as described above to react together, optionally using a urethane-forming catalyst, within a temperature range of 20° C. to 120° C.

If the urethane resin is a product of reaction between a polyol and a polyisocyanate, the ratio of the equivalent weights of the isocyanate groups of the polyisocyanate to the hydroxyl groups of the polyol is preferably between 1/5 and 1/0.5, more preferably between 1/3 and 1/1. A ratio of the equivalent weights of the isocyanate groups of the polyisocyanate to the hydroxyl groups of the polyol falling within these ranges results in better adhesiveness because in such a case it becomes more unlikely that surplus polyisocyanate is left unused and as a consequence bleeds out of the adhesive layer after bonding.

The urethane resin preferably has carboxyl groups. In this case, it is preferred that the resin composition further contain a compound that has an epoxy group. Further details of the compound containing an epoxy group (epoxy-containing compound) are provided hereinafter.

(Other Ingredients)

The resin composition may further contain a modifier. Examples of modifiers include a coupling agent, a silane compound, and an acid anhydride. If the resin composition contains any such modifier, the smectite with partially immobilized lithium is improved in wettability and therefore in dispersibility in the resin composition. One modifier may be used alone, or multiple modifiers may be used in combination.

Examples of coupling agents include silane coupling agents, titanium coupling agents, zirconium coupling agents, and aluminum coupling agents.

Examples of silane coupling agents include amino-containing silane coupling agents, (meth)acryl-containing silane coupling agents, and isocyanate-containing silane coupling agents. Examples of amino-containing silane coupling agents include 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane. Examples of (meth)acryl-containing silane coupling agents include 3-acryloxypropyltrimethoxysilane, 3-methacryloxypropyltrimethoxysilane, and 3-methacryloxypropyltriethoxysilane. An example of an isocyanate-containing silane coupling agent is 3-isocyanatopropyltriethoxysilane.

Examples of titanium coupling agents include isopropyl triisostearoyl titanate, isopropyl trioctanoyl titanate, isopropyl dimethacrylisostearoyl titanate, isopropyl isostearoyl diacryltitanate, isopropyl tris(dioctyl pyrophosphate) titanate, tetraoctyl bis(ditridecyl phosphite) titanate, tetra(2,2-diallyloxymethyl-1-butyl) bis(ditridecyl)phosphite titanate, bis(dioctyl pyrophosphate)oxyacetate titanate, and bis(dioctyl pyrophosphate)ethylene titanate.

Examples of zirconium coupling agents include zirconium acetate, ammonium zirconium carbonate, and zirconium fluoride.

Examples of aluminum coupling agents include acetalkoxyaluminum diisopropylate, aluminum diisopropoxymonoethylacetoacetate, aluminum tris ethylacetoacetate, and aluminum tris acetylacetonate.

Examples of silane compounds include alkoxysilanes, silazanes, and siloxanes. Examples of alkoxysilanes include methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, and 1,6-bis(trimethoxysilyl)hexane, trifluoropropyltrimethoxysilane. An example of a silazane is hexamethyldisilazane. An example of a siloxane is a siloxane that contains a hydrolyzable group.

Examples of acid anhydrides include succinic anhydride, maleic anhydride, phthalic anhydride, trimellitic anhydride, pyromellitic anhydride, tetrahydrophthalic anhydride, methyltetrahydrophthalic anhydride, methylnadic anhydride, hexahydrophthalic anhydride, methylhexahydrophthalic anhydride, and alkenylsuccinic anhydrides.

The modifier loading is preferably between 0.1% and 50% by mass of the whole amount of the smectite with partially immobilized lithium. A modifier loading equal to or higher than 0.1% by mass results in better dispersibility of the smectite with partially immobilized lithium in the resin composition. A modifier loading equal to or lower than 50% by mass results in reduced impact of the modifier(s) on the mechanical characteristics of the resin composition. The modifier loading is preferably between 0.3% and 30% by mass, more preferably between 0.5% and 15% by mass.

The resin composition may contain a solvent, depending on its purpose of use. The solvent can be an organic solvent for example, such as methyl ethyl ketone, acetone, ethyl acetate, butyl acetate, toluene, dimethylformamide, acetonitrile, methyl isobutyl ketone, methanol, ethanol, propanol, methoxypropanol, cyclohexanone, methyl cellosolve, ethyl diglycol acetate, or propylene glycol monomethyl ether acetate. The solvent and its quantity can be selected as appropriate for the purpose of use.

The resin composition may contain additives (excluding compounds that meet the definition of a urethane resin, a smectite with partially immobilized lithium, a modifier, or a solvent) unless the advantages of the present invention are lost. Examples of additives include organic fillers, inorganic fillers, stabilizers (antioxidant, heat stabilizer, ultraviolet absorber, etc.), plasticizers, antistatic agents, lubricants, anti-blocking agents, coloring agents, nucleators, oxygen scavengers (compounds capable of trapping oxygen), tackifiers, crosslinking agents, and curing catalysts. These additives are used alone, or two or more are used in combination.

Inorganic fillers as a type of additive include inorganic substances, such as metals, metal oxides, resins, and minerals, and composites thereof. Specific examples of inorganic fillers include silica, alumina, titanium, zirconia, copper, iron, silver, mica, talc, aluminum flakes, glass flakes, and clay minerals. Among these, it is particularly preferred to use a clay mineral for the purpose of improving gas barrier properties. Among clay minerals, the use of a swellable inorganic layer compound in particular is more preferred.

Examples of swellable inorganic layer compounds include silicate hydrates (e.g., phyllosilicate minerals), kaolinite clay minerals (e.g., halloysite), smectite clay minerals (e.g., montmorillonite, beidellite, nontronite, saponite, hectorite, sauconite, and stevensite), and vermiculite clay minerals (e.g., vermiculite). These minerals may be natural or synthesized clay minerals.

Examples of compounds capable of trapping oxygen include low-molecular-weight organic compounds that react with oxygen, such as hindered phenolic compounds, vitamin C, vitamin E, organic phosphorus compounds, gallic acid, and pyrogallol, and compounds of transition metals, such as cobalt, manganese, nickel, iron, and copper.

Examples of tackifiers include xylene resins, terpene resins, phenolic resins, and rosin resins. Adding a tackifier helps improve adhesion to film materials upon application. The amount of tackifier added is preferably between 0.01 and 5 parts by mass based on the whole amount of the resin composition as 100 parts by mass.

Examples of crosslinking agents include isocyanate compounds and polyol compounds. The amount of a crosslinking agent may be between 1% and 10% by mass of the total nonvolatile content of the resin composition.

Examples of curing catalysts include phosphorus-based curing catalysts, such as triphenylphosphine, and amine-based curing catalysts, such as imidazole. The amount of a curing catalyst may be between 0.1% and 5% by mass of the total nonvolatile content of the resin composition.

The following describes preferred modes of this resin composition in detail.

First Embodiment

A resin composition according to a first embodiment contains a urethane resin P1, a urethane resin P1 that is a product of reaction (product of polyaddition) between a compound A, represented by formula (1), and a compound B, represented by formula (2) and has carboxyl groups, and a smectite with partially immobilized lithium.

[Chem. 5]

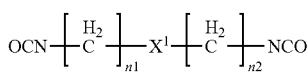
(1)

[In formula (1), $X^1$ represents an aliphatic or aliphatic ring structure, and n1 and n2 each independently represent an integer of 0 to 3.]

[Chem. 6]

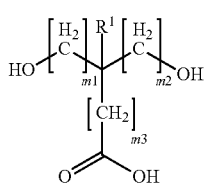
(2)

[In formula (2), $R^1$ represents a hydrogen atom, 01-3 hydrocarbon group, or carbonyl group, and m1 to m3 each independently represent an integer of 0 to 3.]

The urethane resin P1 is a reaction product obtained through polyaddition (product of polyaddition) between compounds A and B (reaction between the isocyanate groups of the compound A and the hydroxyl groups of the compound B) and is a urethane resin that has carboxyl groups. The ends of the backbone of the urethane resin P1 may be isocyanate groups or hydroxyl groups. The ends of the backbone of the urethane resin P1 may be capped with a capping agent.

The resin composition according to this embodiment may be one obtained by synthesizing a urethane resin P1 and mixing the synthesized urethane resin P1 with a smectite with partially immobilized lithium or may be one obtained by blending a compound A, a compound B, and a smectite with partially immobilized lithium and then allowing the compounds A and B to react together. The resin composition may alternatively be one obtained by mixing one of compounds A and B with a smectite with partially immobilized lithium and then mixing the resulting mixture with the other of the compounds A and B to allow the compounds A and B to react together.

The compound A is an isocyanate-bearing compound represented by formula (1) above. In the compound A, X' represents an aromatic or aliphatic ring structure. In this embodiment, the resin composition according to this embodiment exhibits high barrier properties by virtue of the compound A having an aromatic or aliphatic ring structure.

An aromatic ring structure is preferably a structure that has a C6-18 aromatic ring (divalent aromatic ring group). Examples of such aromatic ring structures include the benzene ring structure (phenylene group), naphthalene ring structure (naphthylene group), phenanthrene ring structure (phenanthrenylene group), and anthracene ring structure (anthracenylene group). An aromatic ring in $X^1$ may be substituted with at least one fluorine atom. An example of a group having such an aromatic ring is the perfluorophenylene group.

An aliphatic ring structure is preferably a structure that has a C3-20 aliphatic ring (divalent alicyclic group). The aliphatic ring may be a simple ring or fused ring. A simple aliphatic ring structure can be, for example, a cycloalkane structure (cycloalkylene group) or cycloalkene structure (cycloalkenylene group). Examples of cycloalkane structures include the cyclopropane structure (cyclopropylene group), cyclobutane structure (cyclobutylene group), cyclopentane structure (cyclopentylene group), cyclohexane structure (cyclohexylene group), cycloheptane structure (cycloheptylene group), cyclooctane structure (cyclooctylene group), cyclononane structure (cyclononylene group), cyclodecane structure (cyclodecanylene group), cyclododecane structure (cycloundecanylene group), and cyclododecane structure (cyclododecanylene group). Examples of cycloalkene structures (cycloalkenylene groups) include the cyclopropene structure (cyclopropenylene group), cyclobutene structure (cyclobutenylene group), cyclopentene structure (cyclopentenylene group), cyclohexene structure (cyclohexenylene group), cycloheptene structure (cycloheptenylene group), and cyclooctene structure (cyclooctenylene group). Examples of fused aliphatic ring structures include the bicycloundecane structure (bicycloundecanylene group), decahydronaphthalene structure (decahydronaphthylene group), norbornene structure (norbornenylene group), and norbornadiene structure (norbornadienylene group). An aliphatic ring structure may alternatively be a structure of cubane, basketane, housane, etc., which are polycyclic compounds.

$X^1$ may be a ring structure in which aromatic and aliphatic rings are combined. Preferably, $X^1$ is a benzene ring or naphthalene ring structure. A benzene ring or naphthalene ring structure in $X^1$ results in higher oxygen barrier properties under high-humidity conditions.

n1 and n2 in formula (1) are preferably, each independently, 0 or 1 so that higher barrier properties will be obtained. In order for even higher barrier properties to be achieved, at least one of n1 and n2 may be 1 or more.

Specific examples of preferred compounds A include the following compounds.

[Chem. 7]

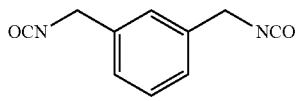

[Chem. 8]

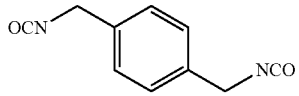

[Chem. 9]

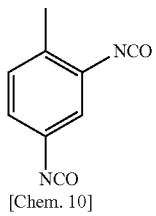

[Chem. 10]

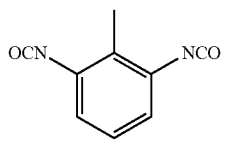

[Chem. 11]

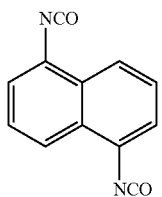

One compound A may be used alone, or two or more may be used in combination.

The compound B is a carboxyl-bearing diol compound represented by formula (2). By virtue of having a carboxyl group, the compound B can form a crosslink structure by reacting with a compound C, which is described hereinafter. If the resin composition contains a compound C in this embodiment, the compounds B and C react together, forming a crosslink structure, and this results in higher oxygen barrier properties under high-humidity conditions.

In formula (2), m1 and m2 are preferably 0 or 1, and m3 is preferably 0 so that higher barrier properties will be obtained. In order for high barrier properties to be achieved, at least one of m1 and m2 may be 1 or more. For higher barrier properties to be attained, $R^1$ is preferably a C1-3 hydrocarbon group. In light of these, a more preferred compound B is a compound in which m3 is 0, and $R^1$ is a C1-3 hydrocarbon group.

Specific examples of preferred compounds B include dimethylolpropionic acid and dimethylolbutanoic acid.

One compound B may be used alone, or two or more may be used in combination.

One such urethane resin P1 may be used alone, or two or more may be used in combination.

The weight-average molecular weight (Mw) of the urethane resin P1 is preferably between 500 and 1000000, more preferably between 700 and 500000. A weight-average molecular weight in these ranges helps achieve superior gas barrier properties. Here, the weight-average molecular weight (Mw) is a polystyrene-equivalent value based on measurement by gel permeation chromatography (Hereinafter gel permeation chromatography is abbreviated to "GPC.").

The amount of the urethane resin P1 may be between 50% and 97% by mass, may be between 70% and 93% by mass, or may be between 80% and 95% by mass of the total nonvolatile content of the resin composition. That is, the amount of the urethane resin P1 may be 50% by mass or more, 70% by mass or more, or 80% by mass or more and may be 97% by mass or less, 93% by mass or less, or 95% by mass or less of the total nonvolatile content of the resin composition. An amount of the urethane resin P1 equal to or higher than 50% by mass results in even better water vapor and oxygen barrier properties. An amount of the urethane resin P1 equal to or lower than 97% by mass results in even better formability of the resin composition. As mentioned above, in this embodiment, the nonvolatile content is the mass that is left after subtracting the mass of diluents and the mass of volatile components in the urethane resin P1, in modifiers, and in additives from the total mass of the resin composition.

The resin composition in this embodiment, preferably, further contains a compound that contains an epoxy group (epoxy-containing compound) as a compound C. The compound C functions as, for example, a crosslinking agent that forms a crosslink structure by reacting with carboxyl groups of the urethane resin P1 (e.g., carboxyl groups originating in the compound B). The compound C has one or more, preferably two or more, epoxy groups. Compounds C having two or more epoxy groups provide a greater improvement in the oxygen barrier properties under high-humidity conditions by forming a denser crosslink structure.

The compound C may be an aromatic epoxy compound or may be an aliphatic epoxy compound. Examples of aromatic epoxy compounds include bisphenol-A epoxy resins, bisphenol-F epoxy resins, bisphenol-S epoxy resins, bisphenol-AD epoxy resins, resorcinol epoxy resins, catechol epoxy resins, dihydroxynaphthalene epoxy resins, biphenyl epoxy resins, and tetramethylbiphenyl epoxy resins, epoxy compounds that are trifunctional or have more epoxy groups in the structure of anthracene, biphenyl, bisphenol A, bisphenol F, bisphenol S, etc., solid bisphenol-A epoxy resins, phenol-novolac epoxy resins, cresol-novolac epoxy resins, triphenylmethane epoxy resins, tetraphenylethane epoxy resins, epoxy resins resulting from dicyclopentadiene-phenol addition reaction, phenol-aralkyl epoxy resins, naphthol-novolac epoxy resins, naphthol-aralkyl epoxy resins, novolac epoxy resins resulting from naphthol-phenol co-condensation, novolac epoxy resins resulting from naphthol-cresol co-condensation, phenolic resin-type epoxy resins modified with an aromatic hydrocarbon formaldehyde resin, and biphenyl-modified novolac epoxy resins. Examples of aliphatic epoxy compounds include ethylene glycol diglycidyl ether, propylene glycol diglycidyl ether, butanediol diglycidyl ether, neopentyl glycol diglycidyl ether, and hexanediol diglycidyl ether.

The compound C is preferably a compound that has an aromatic or aliphatic ring structure and two or more epoxy groups. The presence of an aromatic or aliphatic ring structure in the compound C results in higher barrier properties. Moreover, given that a crosslink structure is formed through reaction between the epoxy group(s) of the compound C and the carboxyl group of the compound B, the presence of two or more epoxy groups in the compound C results in higher oxygen barrier properties under high-humidity conditions. Among such compounds, examples of preferred compounds include epoxy compounds that have alicyclic epoxy groups (alicyclic epoxy compounds) and those compounds represented by formula (3) below.

[Chem. 12]

$$[X^2]+[R^2]_{n3} \qquad (3)$$

[In formula (3), $X^2$ represents an aromatic or aliphatic ring structure, n3 represents an integer of 2 to 6, and $R_2$s each independently represent a group represented by formula (4) below.

[Chem. 13]

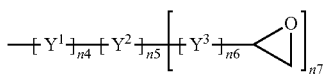

(4)

(In formula (4), $Y^1$ and $Y^3$ each independently represent a divalent hydrocarbon group or oxygen atom, $Y^2$ represents a trivalent hydrocarbon group or nitrogen atom, n4 and n6 each independently represent an integer of 0 to 3, n5 represents 0 or 1, n7 represents 1 or 2, if n5 is 0, n7 is 1, and if n5 is 1, n7 is 2.)]

If the compound C is a compound represented by formula (3), examples of aromatic or aliphatic ring structures in $X^2$ are the same structures as listed above for the aromatic or aliphatic ring structure in a compound A. Among those, it is particularly preferred that $X^2$ be a benzene ring structure (phenylene group), naphthalene ring structure (naphthylene group), or cycloalkane structure (cycloalkylene group) so that higher oxygen barrier properties under high-humidity conditions will be obtained. $Y_1$, moreover, is preferably an oxygen atom so that higher barrier properties will be obtained. In light of these, it is preferred that $X^2$ be a benzene ring structure (phenylene group), naphthalene ring structure (naphthylene group), or cycloalkane structure (cycloalkylene group) with $Y^1$ being an oxygen atom.

If the compound C is a compound represented by formula (3), examples of particularly preferred compounds include the following compounds.

[Chem. 14]

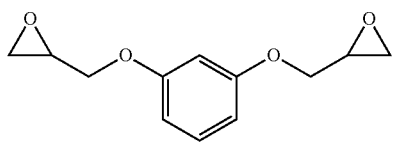

[Chem. 15]

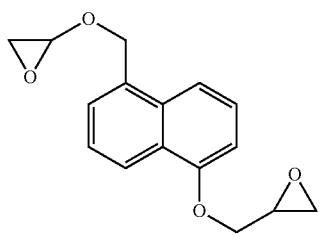

[Chem. 16]

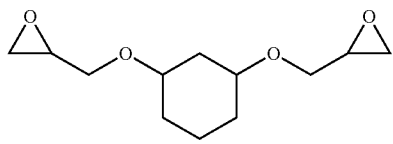

As for alicyclic epoxy compounds, those compounds having at least one alicyclic epoxy group selected from the group consisting of the cyclopentene oxide and cyclohexene oxide groups are preferred. Of alicyclic epoxy compounds, an example of a particularly preferred compound is the following compound.

[Chem. 17]

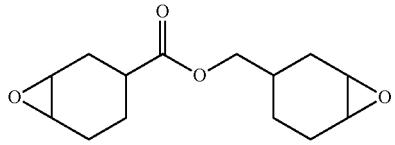

The resin composition may contain an epoxy-containing silane coupling agent as a compound C. Examples of epoxy-containing silane coupling agents include 3-glycidoxypropyltrimethoxysilane, 3-glycidoxypropyltriethoxysilane, 3-glycidoxypropylmethyldiethoxysilane, and 2-(3,4 epoxy-cyclohexyl)ethyltrimethoxysilane.

One compound C may be used alone, or two or more may be used in combination.

If the resin composition contains a compound C, the molar ratio of epoxy groups to carboxyl groups (e.g., carboxyl groups originating in the compound B) in the resin composition is preferably between 0.1 and 1.8, more preferably between 0.1 and 1.5. A molar ratio of epoxy groups to carboxyl groups equal to or higher than 0.1 results in a resin composition superior in curability and good in formability. A molar ratio of epoxy groups to carboxyl groups equal to or lower than 1.8 results in satisfactory oxygen barrier properties under high-humidity conditions.

A resin composition according to the first embodiment may contain, as extra ingredients, a modifier and a solvent as described above and, unless the advantages of the present invention are lost, may further contain a compound A, a compound B, and additives as described above. Preferred ranges for the amount of these extra ingredients are as discussed above. The compounds A and B may be contained as crosslinking agents.

Second Embodiment

A resin composition according to a second embodiment contains a urethane resin P2 as a product of reaction between a urethane resin P1 and a compound C (e.g., a reaction product obtained through reaction between carboxyl groups of the urethane resin P1 and the epoxy group(s) of the compound C) and a smectite with partially immobilized lithium. The details of the smectite with partially immobilized lithium and the compounds A, B, and C forming the urethane resin P2 in the second embodiment are the same as in the first embodiment.

The weight-average molecular weight (Mw) of the urethane resin P2 is preferably between 500 and 1000000, more preferably between 700 and 500000. A weight-average molecular weight in these ranges helps achieve superior gas barrier properties. Here, the weight-average molecular weight (Mw) is a polystyrene-equivalent value based on measurement by GPC.

The amount of the urethane resin P2 may be between 50% and 97% by mass, may be between 70% and 97% by mass, or may be between 80% and 95% by mass of the total nonvolatile content of the resin composition. That is, the amount of the urethane resin P2 may be 50% by mass or more, 70% by mass or more, or 80% by mass or more and may be 97% by mass or less, 93% by mass or less, or 93% by mass or less of the total nonvolatile content of the resin composition. An amount of the urethane resin P2 equal to or higher than 50% by mass results in even better water vapor and oxygen barrier properties. An amount of the urethane resin P2 equal to or lower than 97% by mass results in even better formability of the resin composition. As mentioned above, in this embodiment, the nonvolatile content is the mass that is left after subtracting the mass of diluents and the mass of volatile components in the urethane resin P2, in modifiers, and in additives (and in compounds A, B, and C and urethane resins P1, if these ingredients are contained) from the total mass of the resin composition.

A resin composition according to the second embodiment may contain, as extra ingredients, a modifier and a solvent as described above and, unless the advantages of the present invention are lost, may further contain compounds A, B, and C, a urethane resin P1, and additives as described above. Preferred ranges for the amount of these extra ingredients are as discussed above.

Third Embodiment

A resin composition according to a third embodiment contains a urethane resin having an alicyclic backbone and a smectite with partially immobilized lithium.

A urethane resin having an alicyclic backbone is a compound having an alicyclic backbone and urethane linkages. A urethane resin in an embodiment preferably has a polystyrene-equivalent weight-average molecular weight of 500 to 1000000 as measured by GPC (gel permeation chromatography).

The alicyclic backbone can be any backbone that includes an aliphatic ring structure (alicyclic structure) and may include a monocyclic or polycyclic structure. In a urethane resin having an alicyclic backbone in an embodiment, the alicyclic backbone preferably includes a bridged ring (Or more commonly it may be referred to as a fused ring.). The bridged ring may be a dicyclo or polycyclo ring.

The bridged ring is preferably a dicycloalkane or tricycloalkane structure, more preferably a tricycloalkane structure. Examples of tricycloalkane structures include the structures of tricyclononane, tricyclononene, tricyclodecane, tricyclodecene, tricycloundecane, tricyclododecane, tricyclotetradecane, tricyclopentadecane, tricyclohexadecane, etc. Particularly preferred is the tricyclodecane structure.

The urethane resin having an alicyclic backbone may be a product of reaction between a polyol and a polyisocyanate. Here, at least one of the polyol and polyisocyanate (one or both) may have an alicyclic structure.

A polyol having an alicyclic structure can be any compound that has an alicyclic structure and two or more hydroxyl groups. Specific examples include alicyclic polyols, alicyclic polyester polyols, alicyclic polyether polyols, alicyclic polycarbonate polyols (e.g., those represented by the general formula HO—$R^3$—[(OCOO)—$R^3$]$_n$—OH (where R is a divalent organic group, and n is a number of 1 or more) and including cycloalkylene groups as the $R^3$s), alicyclic polyolefin polyols, and alicyclic polyacrylic polyols. The polyol having an alicyclic structure is preferably an alicyclic polyol, more preferably a polyol having an alicyclic structure that includes a bridged ring. Examples of polyols having an alicyclic structure that includes a bridged ring include tricyclodecane dimethanol (tricyclo[5.2.1.0$^{2,6}$] decane dimethanol), norbornene dimethanol, and adamantane dimethanol.

A polyisocyanate having an alicyclic structure can be any compound that has an alicyclic structure and two or more isocyanate groups. Specific examples include 1,3-bis(isocyanatomethyl)cyclohexane, cyclohexane diisocyanate, methylcyclohexane diisocyanate, isophorone diisocyanate, dicyclohexylmethane diisocyanate, bis(isocyanatomethyl) tricyclodecane, and norbornene diisocyanate. The polyisocyanate having an alicyclic structure preferably has an alicyclic structure that includes a bridged ring. The polyisocyanate having an alicyclic structure that includes a bridged ring is more preferably bis(isocyanatomethyl)tricyclodecane or norbornene diisocyanate.

One of the polyol and polyisocyanate may lack an alicyclic structure. The polyol(s) lacking an alicyclic structure and polyisocyanate(s) lacking an alicyclic structure may be at least one selected from the polyols and polyisocyanates described above.

A urethane resin having an alicyclic backbone in an embodiment can be produced by, for example, reacting a polyol and a polyisocyanate (at least one having an alicyclic structure) together, optionally using a urethane-forming catalyst, within a temperature range of 20° C. to 120° C.

If the urethane resin having an alicyclic backbone is a product of reaction between a polyol and a polyisocyanate, the ratio of the equivalent weights of the isocyanate groups of the polyisocyanate to the hydroxyl groups of the polyol is preferably between 1/5 and 1/0.5, more preferably between 1/3 and 1/0.8. A ratio of the equivalent weights of the isocyanate groups of the polyisocyanate to the hydroxyl groups of the polyol falling within these ranges results in better adhesiveness because in such a case it becomes more unlikely that surplus polyisocyanate is left unused and as a consequence bleeds out of the adhesive layer after bonding.

In an embodiment, one urethane resin having an alicyclic backbone may be used alone, or two or more urethane resins having an alicyclic backbone may be used in combination.

The amount of the urethane resin having an alicyclic backbone may be between 50% and 97% by mass, may be between 70% and 95% by mass, or may be between 80% and 93% by mass of the total nonvolatile content of the resin composition. An amount of the urethane resin having an alicyclic backbone equal to or higher than 50% by mass results in even better water vapor and oxygen barrier properties. An amount of the urethane resin having an alicyclic backbone equal to or lower than 97% by mass results in even better formability of the resin composition. As mentioned above, in this embodiment, the nonvolatile content is the mass that is left after subtracting the mass of diluents and the mass of volatile components in the urethane resin having an alicyclic backbone, in modifiers, and in additives from the total mass of the resin composition.

The resin composition may be one obtained by synthesizing a urethane resin having an alicyclic backbone and mixing the synthesized urethane resin with a smectite with partially immobilized lithium or may be one obtained by blending a polyisocyanate, a polyol, and a smectite with partially immobilized lithium and then allowing the polyisocyanate and polyol to react together. Alternatively, a mixture prepared beforehand of one urethane raw material (one of a polyisocyanate and a polyol) with a smectite with partially immobilized lithium may be mixed with the other urethane raw material. In any case, at least one of the urethane raw materials (a polyisocyanate and a polyol), which are the raw materials for the urethane resin having an alicyclic backbone, may have an alicyclic structure. Moreover, a urethane catalyst, such as a tin compound, may be used in any case.

The resin compositions described hereinabove (e.g., the resin compositions according to the first, second, and third embodiments) are suitable for use as a gas barrier material by virtue of being superior in water vapor and oxygen barrier properties. The gas barrier material only needs to be one that contains a resin composition as described above.

The resin compositions described hereinabove (e.g., the resin compositions according to the first, second, and third embodiments), moreover, are suitable for use as a coating material. The coating material only needs to be one that contains a resin composition as described above. The method of coating with the coating material is not critical. Examples of specific methods include coating methods such as roll coating and gravure coating. The coater is not critical either. By virtue of having high gas barrier properties, the above resin compositions can be suitably used as a coating material for gas barrier purposes.

The resin compositions described hereinabove (e.g., the resin compositions according to the first, second, and third embodiments), moreover, are suitable for use as an adhesive by virtue of being superior in adhesiveness. The adhesive only needs to be one that contains a resin composition as described above. The adhesive can be in any form; it may be a liquid or paste adhesive or may be a solid adhesive. By virtue of having high gas barrier properties, the above resin compositions can be suitably used as an adhesive for gas barrier purposes.

In the case of a liquid or paste adhesive, it is not critical how it is used, but the user may apply it to the surface to be bonded or pour it between the surfaces to be bonded, join the members together, and cure the adhesive.

In the case of a solid adhesive, the user may place a powder, chip, or sheet shaped from the adhesive between the surfaces to be bonded, join the surfaces together by thermally melting the adhesive, and cure the adhesive.

While resin compositions according to embodiments of the present invention have been described above, the present invention is not limited to the above embodiment.

For example, in another embodiment, the resin composition may be one that contains a smectite with partially immobilized lithium and raw materials that form a urethane resin by reacting together (urethane raw materials). The urethane raw materials are preferably, for example, those that form a urethane resin after coating or bonding, and preferably are a polyol and a polyisocyanate. Examples of polyols and polyisocyanates are as given above. Before coating or bonding, they can be present separated from each other. That is, the resin composition can be used as a two-component composition. If the polyisocyanate is a blocked polyisocyanate, the resin composition can be used as a one-component composition because the urethane raw materials can be present in the mix. If the resin composition is used by mixing two components, one of the urethane raw materials (one of a polyisocyanate and a polyol) or both may be premixed with the smectite with partially immobilized lithium.

The following describes a preferred mode of a resin composition according to this extra embodiment in detail.

Fourth Embodiment

A resin composition according to a fourth embodiment contains a compound A, represented by formula (1) above, a compound B, represented by formula (2) above, and a smectite with partially immobilized lithium and, preferably, further contains a compound C, a compound having an epoxy group.

The details of the smectite with partially immobilized lithium and the compounds A, B, and C in the fourth embodiment are the same as in the first embodiment. For example, the molar ratio of epoxy groups to carboxyl groups in the resin composition is preferably between 0.1 and 1.8. In the fourth embodiment, as compared with the foregoing first and second embodiments, the number of steps can be reduced. In the first and second embodiments, the uniformity of the finished, cured resin composition improves from that in the fourth embodiment owing to lower potential for side reactions.

The ratio of the equivalent weights of the isocyanate groups of the compound A to the hydroxyl groups of the compound B is preferably between 1/5 and 1/0.5, more preferably between 1/3 and 1/0.8. A ratio of the equivalent weights of the isocyanate groups of the compound A to the hydroxyl groups of the compound B falling within these ranges results in better adhesiveness because in such a case it becomes more unlikely that surplus compound A is left unused, making it more unlikely that residual compound A bleeds out of the adhesive layer after bonding.

A resin composition according to the fourth embodiment may contain a modifier and a solvent as described above and, unless the advantages of the present invention are lost, may further contain additives as described above.

As stated above, a resin composition that contains a smectite with partially immobilized lithium and a urethane resin P1 or P2 is superior in water vapor and oxygen barrier properties. That is, superior gas barrier properties are developed when the compounds A and B or the compounds A, B, and C are reacted together in a resin composition according to the fourth embodiment. A resin composition according to the fourth embodiment is therefore suitable for use as a gas barrier material. The gas barrier material only needs to be one that contains a resin composition according to the fourth embodiment.

The resin composition according to the fourth embodiment, moreover, is suitable for use as a coating material. By virtue of having high gas barrier properties, the resin composition according to the fourth embodiment can be suitably used as a coating material for gas barrier purposes. The coating material only needs to be one that contains a resin composition according to the fourth embodiment. The details of the coating method are the same as in the foregoing embodiments.

As stated above, furthermore, a resin composition that contains a smectite with partially immobilized lithium and a urethane resin P1 or P2 is superior in adhesiveness. That is, superior adhesiveness is developed when the compounds A and B or the compounds A, B, and C are reacted together in a resin composition according to the fourth embodiment. The resin composition according to the fourth embodiment is therefore suitable for use as an adhesive. Since a resin composition that contains a smectite with partially immobilized lithium and a urethane resin P1 or P2 as described above has high gas barrier properties, this adhesive can be suitably used as an adhesive for gas barrier purposes. The adhesive only needs to be one that contains a resin composition according to the fourth embodiment. The details of the form and usage of the adhesive are the same as in the foregoing embodiments.

<Molded Article>

A molded article according to an embodiment can be obtained by molding a resin composition as described above. The molded article may be from the resin composition or may be from the cured form of the resin composition. The molding method is at the manufacturer's discretion and can be selected in accordance with the purpose of use when appropriate. The molded article can be in any shape; it may be shaped like a plate, sheet, or film, may have a three-dimensional shape, may be a coating on a substrate, or may be one molded to be present between a substrate and a substrate.

If a plate- or sheet-shaped article is fabricated, possible methods include methods in which the resin composition is molded, for example using extrusion molding, flat stamping, profile extrusion molding, blow molding, compression molding, vacuum molding, or injection molding. If a film-shaped article is fabricated, examples of possible methods include hot melt extrusion, polymer solution casting, inflation film molding, cast molding, extrusion laminating, calender molding, sheet forming, fiber molding, blow molding, injection molding, rotational molding, and coating.

If the resin composition is liquid, it may be molded by coating. Examples of possible coating methods include spraying, spin coating, dipping, roll coating, blade coating, doctor roll coating, doctor blading, curtain coating, slit coating, screen printing, inkjet coating, and dispensing.

<Laminate>

A laminate according to an embodiment is one that has a molded article as described above on a substrate. The laminate may have a two-layer structure, a three-layer structure, or have more layers.

The material for the substrate is not critical and can be selected as appropriate for the purpose of use. The substrate can be made of, for example, wood, metal, plastic, paper, silicone, or a modified silicone or may be a substrate obtained by joining different materials together. The substrate can be in any shape; it may be shaped like a flat plate, a sheet, a three-dimensional shape having curvature throughout or in part of it, or any other shape selected in accordance with the purpose. The hardness, thickness, etc., of the substrate are not critical either.

The laminate can be obtained by laminating the substrate with a molded article as described above. The molded article with which the substrate is laminated may be formed by directly coating the substrate with the resin composition or molding the resin composition directly on the substrate, or an article molded from the resin composition may be placed. For direct coating, the coating method is not critical, and examples of possible methods include spraying, spin coating, dipping, roll coating, blade coating, doctor roll coating, doctor blading, curtain coating, slit coating, screen printing, and inkjet coating. For direct molding, examples of possible molding methods include in-mold forming, film insert molding, vacuum molding, extrusion laminating, and stamping. If an article molded from the cured form of the resin composition is placed, a layer of uncured or partially cured resin composition may be placed on the substrate and then cured, or a layer of completely cured resin composition may be placed on the substrate.

Alternatively, the laminate may be obtained by coating cured resin composition with a precursor to the substrate and then curing the precursor or may be obtained by bonding together a precursor to the substrate and the resin composition with one of them uncured or partially cured and then curing the uncured or partially cured member. The precursor to the substrate can be any substance, and examples include curable resin compositions. The laminate may be prepared by using a resin composition according to an embodiment as an adhesive.

EXAMPLES

The following describes the present invention in further detail by examples, but the present invention is not limited to these.

The filler to be contained in the resin composition was a smectite with partially immobilized lithium or a smectite without partially immobilized lithium. The smectite with partially immobilized lithium was a dispersion slurry of montmorillonite available from Kunimine Industries Co., Ltd. (trade name, RCEC-W; cation exchange capacity, 39.0 meq/100 g). The amount (w/w %) of the smectite with partially immobilized lithium in this dispersion slurry was 20% (w/w %). The smectite without partially immobilized lithium was natural montmorillonite (trade name, KUNIPIA-F; cation exchange capacity, 108 meq/100 g; Kunimine Industries Co., Ltd.; KUNIPIA is a registered trademark).

The modifier was KBM-503, a silane coupling agent (3-methacryloxypropyltrimethoxysilane, trade name, Shin-Etsu Chemical Co., Ltd.).

Synthesis Example 1: Synthesis of a Urethane Resin Having Carboxyl Groups

A glass flask equipped with a stirrer, a thermometer, a condenser, and a dripper was charged with 90 parts by mass of DMPA (2,2-dimethylolpropanoic acid, Tokyo Chemical Industry Co., Ltd.), 54 parts by mass of methyl ethyl ketone as a solvent, and 81 parts by mass of tetrahydrofuran, and the materials were stirred in a stream of nitrogen. Then 56 parts by mass of XDI (xylylene diisocyanate; trade name, TAKENATE 500; Mitsui Chemicals, Inc.) was added, and the mixture was heated to 60° C. After 1 hour of stirring, the temperature was reduced to 40° C. or lower, another 56 parts by mass of XDI was added, and the mixture was heated to 60° C. once again. The reaction was continued until the disappearance of isocyanate groups was confirmed by infrared spectrometry. Then 168 parts by mass of methanol was added as a diluent. In this way, polyurethane solution 1, a solution of 40% by mass "DMPA/XDI" urethane resin having carboxyl groups, was obtained.

Synthesis Example 2: Synthesis of a Urethane Resin Having an Alicyclic Backbone

A glass flask equipped with a stirrer, a thermometer, a condenser, and a dripper was charged with 79.1 parts by mass of TCDDM (tricyclodecane dimethanol, Tokyo Chemical Industry Co., Ltd.) and 52.9 parts by mass of MEK (methyl ethyl ketone) as a solvent, and the materials were heated to 60° C. with stirring in a stream of nitrogen. Then with the inside of the flask kept at 60° C., 47.9 parts by mass of XDI (xylylene diisocyanate; trade name, TAKENATE 500; Mitsui Chemicals, Inc.) was added dropwise over 1 hour. After the end of dripping, the mixture was stirred at 60° C. for 5 hours, and the disappearance of isocyanate groups was confirmed by infrared spectrometry. Then 51 parts by mass of MEK was added. In this way, polyurethane solution 2, a solution of 55% by mass "TCDDM/XDI" urethane resin having an alicyclic backbone, was obtained.

Preparation Example 1

Silane coupling agent solution 1 was prepared by mixing 2.4 parts by mass of a silane coupling agent, 0.5 parts by mass of water, 123 parts by mass of 2-propanol, and 0.1 parts by mass of 0.1 mol/l hydrochloric acid and stirring the mixture for 2 hours.

Preparation Example 2

Silane coupling agent solution 2 was prepared by mixing 25 parts by mass of a silane coupling agent, 5.5 parts by mass of water, 1278 parts by mass of 2-propanol, and 1.3 parts of 0.1 mol/l hydrochloric acid and stirring the mixture for 2 hours.

Preparation Example 3

Silane coupling agent solution 3 was prepared by mixing 5.8 parts by mass of a silane coupling agent, 1.3 parts by mass of water, 76.5 parts by mass of 2-propanol, and 2.4 parts by mass of 0.1 mol/l hydrochloric acid and stirring the mixture for 2 hours.

Example 1

To 1.00 part by mass of polycarbonate diol (trade name, DURANOL T5651; Asahi Kasei Corporation), 1.74 parts by mass of the dispersion slurry of a smectite with partially immobilized lithium, 4.27 parts by mass of acetone, 0.48 parts by mass of 2-propanol, and 1.26 parts by mass of silane coupling agent solution 1 were added. The materials were kept under stirring for 8 hours. Then 0.73 parts by mass of TMP-XDI (xylylene diisocyanate-trimethylolpropane adduct; trade name, TAKENATE D-110N; Mitsui Chemicals, Inc.; solids content, 75% by mass) was added. In this way, a resin composition of Example 1 was obtained. This composition was named liquid coating 1.

A 12-μm corona-treated PET film (Toyobo Co., Ltd., "E-5100") was coated with liquid coating 1 using a bar coater on its corona-treated surface to a dry coating thickness of 2 μm. Shortly after coating, the coated PET film was heated in a drying oven at 120° C. for 1 minute. The film was then heated in a drying oven at 130° C. for 2 hours. In this way, an article molded from the resin composition of Example 1 was formed on the PET film, and a film laminate of Example 1 was obtained.

In the resin composition and molded article of Example 1, the amount of the smectite with partially immobilized lithium (filler content) was 18% by mass of the total non-volatile content.

Example 2

To 1.00 part by mass of polycarbonate diol (trade name, DURANOL T5651; Asahi Kasei Corporation), 18.1 parts by mass of the smectite with partially immobilized lithium, parts by mass of acetone 44.4, 5.00 parts by mass of 2-propanol, and 13.1 parts by mass of silane coupling agent solution 2 were added. The materials were kept under stirring for 8 hours. Then 0.73 parts by mass of TMP-XDI (xylylene diisocyanate-trimethylolpropane adduct; trade name, TAKENATE D-110N; Mitsui Chemicals, Inc.; solids content, 75% by mass) was added. In this way, a resin composition of Example 2 was obtained. This composition was named liquid coating 2.

An article molded from the resin composition of Example 2 was formed on a PET film as in Example 1 except that liquid coating 1 was replaced with liquid coating 2. In this way, a film laminate of Example 2 was obtained.

In the resin composition and molded article of Example 2, the amount of the smectite with partially immobilized lithium (filler content) was 70% by mass of the total non-volatile content.

Example 3

A resin composition of Example 3 was obtained as in Example 1 except that the polycarbonate diol (trade name, DURANOL T5651; Asahi Kasei Corporation) was replaced with polytetramethylene ether glycol (PTMG1000; Mitsubishi Chemical Corporation; average molecular weight, 1000) and that its amount was changed to that in Table 2 (unit: parts by mass). This composition was named liquid coating 3.

An article molded from the resin composition of Example 3 was formed on a PET film as in Example 1 except that liquid coating 1 was replaced with liquid coating 3. In this way, a film laminate of Example 3 was obtained.

In the resin composition and molded article of Example 3, the amount of the smectite with partially immobilized lithium (filler content) was 18% by mass of the total non-volatile content.

Example 4

To a container, 2.5 parts by mass of polyurethane solution 1, 1.1 parts by mass of the dispersion slurry of a smectite with partially immobilized lithium, 0.5 parts by mass of methanol, and 1.1 parts by mass of acetonitrile were added. The materials were kept under stirring for 8 hours. In this way, a resin composition of Example 4 was obtained. This composition was named liquid coating 4.

An article molded from the resin composition of Example 4 was formed on a PET film as in Example 1 except that liquid coating 1 was replaced with liquid coating 4. In this way, a film laminate of Example 4 was obtained.

In the resin composition and molded article of Example 4, the amount of the smectite with partially immobilized lithium (filler content) was 18% by mass of the total non-volatile content.

Example 5

To a container, 2.5 parts by mass of polyurethane solution 1, 0.35 parts by mass of the dispersion slurry of a smectite with partially immobilized lithium, 0.5 parts by mass of methanol, 0.35 parts by mass of acetonitrile, and 0.013 parts by mass of triphenylphosphine as a curing catalyst were added. The materials were kept under stirring for 8 hours. Then 0.32 parts by mass of resorcinol diglycidyl ether (trade name, Denacol EX201; Nagase ChemteX Corporation) (Denacol is a registered trademark; the same applies hereinafter) was added. In this way, a resin composition of Example 5 was obtained. This composition was named liquid coating 5.

An article molded from the resin composition of Example 5 was formed on a PET film as in Example 1 except that liquid coating 1 was replaced with liquid coating 5. In this way, a film laminate of Example 5 was obtained.

In the resin composition and molded article of Example 5, the amount of the smectite with partially immobilized lithium (filler content) was 5% by mass of the total non-volatile content.

Examples 6 to 10

Resin compositions of Examples 6 to 10 were obtained as in Example 5 except that the amounts of each ingredient were changed to those in Table 3 (unit: parts by mass). These compositions were named liquid coatings 6 to 10. Articles molded from the resin compositions of Examples 6 to 10 were formed on PET films as in Example 1 except that liquid coating 1 was replaced with liquid coatings 6 to 10, respectively. In this way, film laminates of Examples 6 to 10 were obtained.

In the resin compositions and molded articles of Examples 6 to 10, the amounts of the smectite with partially immobilized lithium (filler content levels) were 10% by mass, 18% by mass, 30% by mass, 50% by mass, and 70% by mass, respectively, of the total nonvolatile content.

Example 11

To a container, 2.5 parts by mass of polyurethane solution 1, 1.49 parts by mass of the dispersion slurry of a smectite with partially immobilized lithium, 0.5 parts by mass of methanol, 1.49 parts by mass of acetonitrile, and 0.014 parts by mass of triphenylphosphine as a curing catalyst were added. The materials were kept under stirring for 8 hours. Then 0.36 parts by mass of 3',4'-epoxycyclohexylmethyl 3,4-epoxycyclohexane carboxylate (trade name, CELLOXIDE 2021P; Daicel Corporation) (CELLOXIDE is a registered trademark) was added. In this way, a resin composition of Example 11 was obtained. This composition was named liquid coating 11.

An article molded from the resin composition of Example 11 was formed on a PET film as in Example 1 except that liquid coating 1 was replaced with liquid coating 11. In this way, a film laminate of Example 11 was obtained.

In the resin composition and molded articles of Example 11, the amount of the smectite with partially immobilized lithium (filler content) was 18% by mass of the total nonvolatile content.

Example 12

Three point five parts by mass of polyurethane solution 2, 2.65 parts by mass of the dispersion slurry of a smectite with partially immobilized lithium, 4.86 parts by mass of MEK, 2.65 parts by mass of acetonitrile, and 0.86 parts by mass of silane coupling agent solution 3 were added and kept under stirring for 8 hours. Then 0.46 parts by mass of XDI (xylylene diisocyanate; trade name, TAKENATE 500; Mitsui Chemicals, Inc.) was added. In this way, a resin composition of Example 12 was obtained. This composition was named liquid coating 12.

An article molded from the resin composition of Example 12 was formed on a PET film as in Example 1 except that liquid coating 1 was replaced with liquid coating 12. In this way, a film laminate of Example 12 was obtained.

In the resin composition and molded article of Example 12, the amount of the smectite with partially immobilized lithium (filler content) was 18% by mass of the total nonvolatile content.

Example 13

Three point five parts by mass of polyurethane solution 2, 27.8 parts by mass of the dispersion slurry of a smectite with partially immobilized lithium, 2.0 parts by mass of MEK, 27.8 parts by mass of acetone, and 9.1 parts by mass of silane coupling agent solution 3 were added and kept under stirring for 8 hours. Then 0.46 parts by mass of XDI (xylylene diisocyanate; trade name, TAKENATE 500; Mitsui Chemicals, Inc.) was added. In this way, a resin composition of Example 13 was obtained. This composition was named liquid coating 13.

An article molded from the resin composition of Example 13 was formed on a PET film as in Example 1 except that liquid coating 1 was replaced with liquid coating 13. In this way, a film laminate of Example 13 was obtained.

In the resin composition and molded article of Example 13, the amount of the smectite with partially immobilized lithium (filler content) was 70% by mass of the total nonvolatile content.

Comparative Example 1

To 1.00 part by mass of polycarbonate diol (trade name, DURANOL T5651; Asahi Kasei Corporation), 3.62 parts by mass of the natural montmorillonite, 44.4 parts by mass of acetone, 5.00 parts by mass of 2-propanol, and 13.1 parts by mass of silane coupling agent solution 1 were added. The materials were kept under stirring for 8 hours. Then 0.73 parts by mass of TMP-XDI (xylylene diisocyanate-trimethylolpropane adduct; trade name, TAKENATE D-110N; Mitsui Chemicals, Inc.; solids content, 75% by mass) was added. In this way, a resin composition of Comparative Example 1 was obtained. This composition was named comparative liquid coating 1.

An article molded from the resin composition of Comparative Example 1 was formed on a PET film as in Example 1 except that liquid coating 1 was replaced with comparative liquid coating 1. In this way, a film laminate of Comparative Example 1 was obtained.

In the resin composition and molded article of Comparative Example 1, the amount of the natural montmorillonite (filler content) was 70% by mass of the total nonvolatile content.

Comparative Example 2

A resin composition of Comparative Example 2 was obtained as in Example 1 except that the dispersion slurry of a smectite with partially immobilized lithium and silane coupling agent solution 1 were not used. This composition was named comparative liquid coating 2. An article molded from the resin composition of Comparative Example 2 was formed on a PET film as in Example 1 except that liquid coating 1 was replaced with comparative liquid coating 2. In this way, a film laminate of Comparative Example 2 was obtained.

Comparative Example 3

A resin composition of Comparative Example 3 was obtained as in Example 3 except that the dispersion slurry of a smectite with partially immobilized lithium and silane coupling agent solution 1 were not used. This composition was named comparative liquid coating 3. An article molded from the resin composition of Comparative Example 3 was formed on a PET film as in Example 1 except that liquid coating 1 was replaced with comparative liquid coating 3. In this way, a film laminate of Comparative Example 3 was obtained.

Comparative Example 4

Two point five parts by mass of polyurethane solution 1, 3.12 parts by mass of the natural montmorillonite, 0.5 parts by mass of methanol, 3.12 parts by mass of acetonitrile, and 0.013 parts by mass of triphenylphosphine as a curing catalyst were added and kept under stirring for 8 hours. Then 0.32 parts by mass of resorcinol diglycidyl ether (trade name, Denacol EX201; Nagase ChemteX Corporation) was added. In this way, a resin composition of Comparative Example 4 was obtained. This composition was named comparative liquid coating 4.

An article molded from the resin composition of Comparative Example 4 was formed on a PET film as in Example 1 except that liquid coating 1 was replaced with comparative liquid coating 4. In this way, a film laminate of Comparative Example 4 was obtained.

In the resin composition and molded article of Comparative Example 4, the amount of the natural montmorillonite (filler content) was 70% by mass of the total nonvolatile content.

Comparative Example 5

Two point five parts by mass of polyurethane solution 1, 0.5 parts by mass of methanol, 0.46 parts by mass of acetonitrile, and 0.013 parts by mass of triphenylphosphine as a curing catalyst were added and kept under stirring for 8 hours. Then 0.32 parts by mass of resorcinol diglycidyl ether (trade name, Denacol EX201; Nagase ChemteX Corporation) was added. In this way, a resin composition of Comparative Example 5 was obtained. This composition was named comparative liquid coating 5.

An article molded from the resin composition of Comparative Example 5 was formed on a PET film as in Example 1 except that liquid coating 1 was replaced with comparative liquid coating 5. In this way, a film laminate of Comparative Example 5 was obtained.

Comparative Example 6

Three point five parts by mass of polyurethane solution 2, 5.6 parts by mass of the natural montmorillonite, 2.0 parts by mass of MEK, 27.8 parts by mass of acetone, and 9.1 parts by mass of silane coupling agent solution 3 were added and kept under stirring for 8 hours. Then 0.46 parts by mass of XDI (xylylene diisocyanate; trade name, TAKENATE 500; Mitsui Chemicals, Inc.) was added. In this way, a resin composition of Comparative Example 6 was obtained. This composition was named comparative liquid coating 6.

An article molded from the resin composition of Comparative Example 6 was formed on a PET film as in Example 1 except that liquid coating 1 was replaced with comparative liquid coating 6. In this way, a film laminate of Comparative Example 6 was obtained.

In the resin composition and molded article of Comparative Example 6, the amount of the natural montmorillonite (filler content) was 70% by mass of the total nonvolatile content.

Comparative Example 7

A resin composition of Comparative Example 7 was obtained as in Example 12 except that the dispersion slurry of a smectite with partially immobilized lithium, acetonitrile, and silane coupling agent solution 3 were not used. This composition was named comparative liquid coating 7. An article molded from the resin composition of Comparative Example 7 was formed on a PET film as in Example 1 except that liquid coating 1 was replaced with comparative liquid coating 7. In this way, a film laminate of Comparative Example 7 was obtained.

<Testing>

The film laminates of Examples 1 to 13 and Comparative Examples 1 to 7 were tested for film formation, oxygen permeability, and water vapor permeability. The test results are presented in Tables 1 to 4. The tests for film formation, oxygen permeability, and water vapor permeability were performed as follows.

(Film Formation)

Film formation was graded "A" if the coated surface of the film laminate was smooth or "B" if the coated surface was not smooth.

(Oxygen Permeability)

The measurement of oxygen permeability was conducted in an atmosphere at a temperature of 23° C. and a humidity of 0% RH and in an atmosphere at a temperature of 23° C. and a humidity of 90% RH using MOCON OX-TRAN 1/50 oxygen transmission rate test system in accordance with JIS-K7126 (equal-pressure method). RH stands for relative humidity.

(Water Vapor Permeability)

The measurement of water vapor permeability was conducted in an atmosphere at a temperature of 40° C. and a humidity of 90% RH using Systech Illinois 7001 water vapor permeation analyzer in accordance with JIS-K7129.

TABLE 1

| | | | Example 1 | Example 2 | Comparative Example 1 | Comparative Example 2 |
|---|---|---|---|---|---|---|
| Formula | Resins | DURANOL T5651 | 1.00 | 1.00 | 1.00 | 1.00 |
| | | TAKENATE D-110N | 0.73 | 0.73 | 0.73 | 0.73 |
| | Solvents | Acetone | 4.27 | 44.4 | 44.4 | 4.27 |
| | | 2-Propanol | 0.48 | 5.00 | 5.00 | 0.48 |
| | Fillers | RCEC-W (NV20%) | 1.74 | 18.1 | — | — |
| | | KUNIPIA-F | — | — | 3.62 | — |
| | Modifier | Silane coupling agent solution | 1.26 | 13.1 | 13.1 | — |
| | Filler content (% by mass) | | 18 | 70 | 70 | — |
| Testing | Oxygen permeability 0% RH (cc/m$^2$ · day · atm) | | 44 | 40 | 94 | 144 |
| | Oxygen permeability 90% RH (cc/m$^2$ · day · atm) | | 45 | 60 | 75 | 117 |
| | Water vapor permeability (g/m$^2$ · day) | | 23 | 30 | 35 | 50 |
| | Film formation | | A | B | B | A |

TABLE 2

| | | | Example 3 | Comparative Example 3 |
|---|---|---|---|---|
| Formula | Resins | PTMG1000 | 1.00 | 1.00 |
| | | TAKENATE D-110N | 0.73 | 0.73 |
| | Solvents | Acetone | 4.27 | 4.27 |
| | | 2-Propanol | 0.48 | 0.48 |
| | Fillers | RCEC-W (NV20%) | 1.74 | — |
| | Modifier | Silane coupling agent solution | 1.26 | — |
| | Filler content (% by mass) | | 18 | — |

TABLE 2-continued

|  |  | Example 3 | Comparative Example 3 |
|---|---|---|---|
| Testing | Oxygen permeability 0% RH (cc/m² · day · atm) | 38 | 153 |
|  | Oxygen permeability 90% RH (cc/m² · day · atm) | 90 | 118 |
|  | Water vapor permeability (g/m² · day) | 29 | 51 |
|  | Film formation | A | A |

TABLE 3

|  |  |  | Example 4 | Example 5 | Example 6 | Example 7 | Example 8 | Example 9 | Example 10 | Example 11 | Comparative Example 4 | Comparative Example 5 |
|---|---|---|---|---|---|---|---|---|---|---|---|---|
| Formula | Resins | Polyurethane solution 1 | 2.5 | 2.5 | 2.5 | 2.5 | 2.5 | 2.5 | 2.5 | 2.5 | 2.5 | 2.5 |
|  | Solvents | Methanol | 0.5 | 0.5 | 0.5 | 0.5 | 0.5 | 0.5 | 0.5 | 0.5 | 0.5 | 0.5 |
|  |  | Acetonitrile | 1.10 | 0.35 | 0.74 | 1.45 | 2.84 | 6.62 | 15.6 | 1.49 | 3.12 | 0.46 |
|  | Fillers | RCEC-W (NV20%) | 1.10 | 0.35 | 0.74 | 1.45 | 2.84 | 6.62 | 15.6 | 1.49 | — | — |
|  |  | KUNIPIA-F | — | — | — | — | — | — | — | — | 3.12 | — |
|  | Crosslinking agents | Denacol EX201 | — | 0.32 | 0.32 | 0.32 | 0.32 | 0.32 | 0.32 | — | 0.32 | 0.32 |
|  |  | CELLOXIDE 2021P | — | — | — | — | — | — | — | 0.36 | — | — |
|  | Catalyst | Triphenylphosphine | — | 0.013 | 0.013 | 0.013 | 0.013 | 0.013 | 0.013 | 0.014 | 0.013 | 0.013 |
|  | Filler content (% by mass) |  | 18 | 5 | 10 | 18 | 30 | 50 | 70 | 18 | 70 | — |
| Testing | Oxygen permeability 0% RH (cc/m² · day · atm) |  | 0.9 | 34 | 6.4 | 0.8 | 0.04 | 0.1 | 0.1 | 1.6 | 29 | 40 |
|  | Oxygen permeability 90% RH (cc/m² · day · atm) |  | 5.2 | 35 | 4.7 | 1.2 | 0.1 | 9.2 | 42 | 1.4 | 43 | 45 |
|  | Water vapor permeability (g/m² · day) |  | 8.3 | 34 | 20 | 5.9 | 3.8 | 3.2 | 5.1 | 9.2 | 43 | 45 |
|  | Film formation |  | A | A | A | A | A | B | B | A | B | A |

TABLE 4

|  |  |  | Example 12 | Example 13 | Comparative Example 6 | Comparative Example 7 |
|---|---|---|---|---|---|---|
| Formula | Resins | Polyurethane solution 2 | 3.5 | 3.5 | 3.5 | 3.5 |
|  | Solvents | Acetone | — | 27.8 | 27.8 | — |
|  |  | Acetonitrile | 2.65 | — | — | — |
|  |  | Methyl ethyl ketone | 4.86 | 2.00 | 2.00 | 4.86 |
|  | Fillers | RCEC-W (NV20%) | 2.65 | 27.8 | — | — |
|  |  | KUNIPIA-F | — | — | 5.6 | — |
|  | Crosslinking agents | TAKENATE 500 | 0.46 | 0.46 | 0.46 | 0.46 |
|  | Modifier | Silane coupling agent solution | 0.86 | 9.1 | 9.1 | — |
|  | Filler content (% by mass) |  | 18 | 70 | 70 | — |
| Testing | Oxygen permeability 0% RH (cc/m² · day · atm) |  | 2 | 2.5 | 40 | 74 |
|  | Oxygen permeability 90% RH (cc/m² · day · atm) |  | 18 | 30 | 45 | 53 |
|  | Water vapor permeability (g/m² · day) |  | 5.4 | 8.5 | 31 | 35 |
|  | Film formation |  | A | B | B | A |

From the contrast between Examples 1 and 2 and Comparative Examples 1 and 2 shown in Table 1, that between Example 3 and Comparative Example 3 shown in Table 2, that between Examples 4 to 11 and Comparative Examples 4 and 5 shown in Table 3, and that between Examples 12 and 13 and Comparative Examples 6 and 7 shown in Table 4, it was demonstrated that combining a smectite with partially immobilized lithium and a urethane resin results in superior gas barrier properties.

INDUSTRIAL APPLICABILITY

The resin compositions according to the present invention can be suitably used in various fields, including packaging materials and also electronic materials and building materials, by virtue of being superior in gas barrier properties, in particular water vapor and oxygen barrier properties.

The invention claimed is:

1. A resin composition comprising a urethane resin and a smectite with partially immobilized lithium, and further comprising a compound C; wherein the urethane resin has carboxyl groups, and wherein the compound C has an aromatic or aliphatic ring structure and two or more epoxy groups.

2. The resin composition according to claim 1, wherein the urethane resin is a product of reaction between a polyol and a polyisocyanate.

3. The resin composition according to claim 1, wherein the urethane resin, having carboxyl groups, is a product of reaction between a compound A, represented by formula (1), and a compound B, represented by formula (2):

[Chem. 1]

$$\text{OCN} - \left[ \begin{array}{c} H_2 \\ C \end{array} \right]_{n1} - X^1 - \left[ \begin{array}{c} H_2 \\ C \end{array} \right]_{n2} - \text{NCO} \quad (1)$$

In formula (1), $X^1$ represents an aromatic or aliphatic ring structure, and n1 and n2 each independently represent an integer of 0 to 3,

[Chem. 2]

$$\text{HO} - \left[ \begin{array}{c} H_2 \\ C \end{array} \right]_{m1} - \underset{[CH_2]_{m3}}{\overset{R^1}{C}} - \left[ \begin{array}{c} H_2 \\ C \end{array} \right]_{m2} - \text{OH} \quad (2)$$
$$\underset{O}{\overset{}{\|}} \text{OH}$$

in formula (2), $R^1$ represents a hydrogen atom, C1-3 hydrocarbon group, or carbonyl group, and m1 to m3 each independently represent an integer of 0 to 3.

4. The resin composition according to claim 3, wherein $X^1$ in formula (1) represents a benzene ring or naphthalene ring structure.

5. The resin composition according to claim 1, wherein the compound C is a compound represented by formula (3):

[Chem. 3]

$$[X^2 + [R^2]_{n3} \quad (3)$$

in formula (3), $X^2$ represents an aromatic or aliphatic ring structure, n3 represents an integer of 2 to 6, and $R^e$s each independently represent a group represented by formula (4):

[Chem. 4]

$$-[Y^1]_{n4}[Y^2]_{n5}[Y^3]_{n6} \overset{O}{\underset{}{\triangleleft}}]_{n7} \quad (4)$$

in formula (4), $Y^1$ and $Y^3$ each independently represent a divalent hydrocarbon group or oxygen atom, $Y^2$ represents a trivalent hydrocarbon group or nitrogen atom, n4 and n6 each independently represent an integer of 0 to 3, n5 represents 0 or 1, n7 represents 1 or 2, if n5 is 0, n7 is 1, and if n5 is 1, n7 is 2.

6. The resin composition according to claim 1, wherein the urethane resin is
a product of reaction between a compound C as a compound having an epoxy group and a carboxyl-containing urethane resin as a product of reaction between a compound A, represented by formula (1), and a compound B, represented by formula (2):

[Chem. 5]

$$\text{OCN} - \left[ \begin{array}{c} H_2 \\ C \end{array} \right]_{n1} - X^1 - \left[ \begin{array}{c} H_2 \\ C \end{array} \right]_{n2} - \text{NCO} \quad (1)$$

In formula (1), $X^1$ represents an aromatic or aliphatic ring structure, and n1 and n2 each independently represent an integer of 0 to 3,

[Chem. 6]

$$\text{HO} - \left[ \begin{array}{c} H_2 \\ C \end{array} \right]_{m1} - \underset{[CH_2]_{m3}}{\overset{R^1}{C}} - \left[ \begin{array}{c} H_2 \\ C \end{array} \right]_{m2} - \text{OH} \quad (2)$$
$$\underset{O}{\overset{}{\|}} \text{OH}$$

in formula (2), $R^1$ represents a hydrogen atom, C1-3 hydrocarbon group, or carbonyl group, and m1 to m3 each independently represent an integer of 0 to 3.

7. The resin composition according to claim 1, wherein the urethane resin has an alicyclic backbone.

8. The resin composition according to claim 7, wherein the alicyclic backbone includes a bridged ring.

9. A resin composition comprising a compound A, represented by formula (1), a compound B, represented by formula (2), a smectite with partially immobilized lithium, and a compound C; wherein the urethane resin has carboxyl groups, and wherein the compound C has an aromatic or aliphatic ring structure and two or more epoxy groups,

[Chem. 7]

$$\text{OCN} - \left[ \begin{array}{c} H_2 \\ C \end{array} \right]_{n1} - X^1 - \left[ \begin{array}{c} H_2 \\ C \end{array} \right]_{n2} - \text{NCO} \quad (1)$$

in formula (1), $X^1$ represents an aromatic or aliphatic ring structure, and n1 and n2 each independently represent an integer of 0 to 3,

[Chem. 8]

$$\text{HO} - \left[ \begin{array}{c} H_2 \\ C \end{array} \right]_{m1} - \underset{[CH_2]_{m3}}{\overset{R^1}{C}} - \left[ \begin{array}{c} H_2 \\ C \end{array} \right]_{m2} - \text{OH} \quad (2)$$
$$\underset{O}{\overset{}{\|}} \text{OH}$$

in formula (2), $R^1$ represents a hydrogen atom, C1-3 hydrocarbon group, or carbonyl group, and m1 to m3 each independently represent an integer of 0 to 3.

10. The resin composition according to claim 1, wherein the smectite with partially immobilized lithium has a cation exchange capacity of 1 to 70 meq/100 g.

11. The resin composition according to claim 1, wherein the smectite with partially immobilized lithium is present in an amount of 3% to 70% by mass based on total nonvolatile content of the resin composition.

12. An article molded from a resin composition according to claim 1.

13. A laminate comprising a substrate and a molded article according to claim 12 on the substrate.

14. A gas barrier material comprising a resin composition according to claim 1.

15. A coating material comprising a resin composition according to claim 1.

16. An adhesive comprising a resin composition according to claim 1.

* * * * *